US006714311B2

(12) United States Patent
Hashimoto (10) Patent No.: US 6,714,311 B2
(45) Date of Patent: Mar. 30, 2004

(54) POSITION DETECTION DEVICE, POSITION POINTING DEVICE, POSITION DETECTING METHOD AND PEN-DOWN DETECTING METHOD

(75) Inventor: Akio Hashimoto, Saitama (JP)

(73) Assignee: Xiroku Inc., Tsukuba (JP)

( * ) Notice: Subject to any disclaimer, the term of this patent is extended or adjusted under 35 U.S.C. 154(b) by 119 days.

(21) Appl. No.: 09/922,339

(22) Filed: Aug. 3, 2001

(65) Prior Publication Data

US 2002/0015159 A1 Feb. 7, 2002

(30) Foreign Application Priority Data

Aug. 4, 2000 (JP) ........................................ 2000-236688

(51) Int. Cl.[7] .............................................. G01B 11/14
(52) U.S. Cl. ........................ 356/623; 356/614; 356/623
(58) Field of Search ................................. 356/614, 620, 356/623; 178/18.01, 19.01, 19.05; 250/227.13

(56) References Cited

U.S. PATENT DOCUMENTS 3,498,692 A * 3/1970 Jewitt et al. ................. 345/180
4,107,540 A * 8/1978 Hillman ....................... 250/566
4,705,942 A * 11/1987 Budrikis et al. .......... 250/227.13
4,806,707 A * 2/1989 Landmeier ................ 178/19.05

FOREIGN PATENT DOCUMENTS

| JP | 03-005805 | 1/1991 |
| JP | 09-319501 | 12/1997 |
| JP | 11-085378 | 3/1999 |
| JP | 11-003170 | 6/1999 |

* cited by examiner

Primary Examiner—Rodney Fuller
(74) Attorney, Agent, or Firm—Wells St. John P.S.

(57) ABSTRACT

A position detection device comprising a position pointer having a light reflector for reflecting light, an emitter for emitting light toward the light reflector, a light receiver for receiving light from the light reflector of the position pointer, a coordinate calculator for calculating a position coordinate of the position detecting device based on information from the light receiver. The position pointer is in the form of a pen and has a movable pen-core portion subject to displacement by the pressure on a surface of a board, a light modulator for changing characteristics of the reflection light, and a transmitter for transmitting the displacement of the pen-core portion to the light modulator. The light receiver has an up/down state detector for detecting characteristics of light changed by the light modulator and obtaining a pen-up and a pen-down information of the position pointer.

19 Claims, 10 Drawing Sheets

REFLECTION CHARACTERISTICS

Fig. 3B

REFLECTION CHARACTERISTICS

REFLECTION CHARACTERISTICS

Fig. 9B

REFLECTION CHARACTERISTICS

POSITION DETECTION DEVICE, POSITION POINTING DEVICE, POSITION DETECTING METHOD AND PEN-DOWN DETECTING METHOD

RELATED APPLICATIONS

This application relates to and claims a priority from corresponding Japanese Patent Application No. 2000-236688 filed on Aug. 4, 2000.

BACKGROUND OF THE INVENTION

1. Field of the Invention

The present invention relates to an indication and an input of coordinate positions of a position pointing device which is used in, for example, an optical digitizer. More particularly, it relates to a position detection device in which the indication and input of the coordinate positions are controlled in accordance with the changes in the pressing or contact pressure of the pen tip of a position pointing device with respect to the position detection surface.

2. Description of the Related Art

Conventionally, there has been proposed a coordinate input device wherein incident angles of light coming from the position pointing device are detected at different two positions and then the coordinate of the pointed position is obtained based on the triangular principle. Such coordinate input device using the light is generally called an optical type digitizer.

As a typical optical digitizer, Japanese Patent Application Kokai Publication No. Hei 3-5805 discloses an optical system wherein such light beam as a laser beam is rotated by a rotation mirror and a retroreflected light coming back in the reverse passage from the position pointing device is detected. This type of system has been put to practical use in, for example, black boards.

For example, Japanese Patent Application Kokai Publication No. Hei 9-319501 discloses a system wherein a light emitting diode (LED) is used as a light emitting means and a retroreflective member is provided to a position pointing device, and wherein the receiving light angle of the reflected light coming back after being retroreflected by the retroreflective member onto which the light from the LED incidents is detected by a position sensing device (PSD). The PSD is a non-divided element and is capable of directly obtaining a coordinate value in the form of ratio of voltage values or current values.

As a further example, Japanese Patent Application Kokai Publication No. Hei 11-85378 discloses a system in which the position pointing device itself is provided with such a point light source as an LED and a detection means for detecting writing pressure, and in which a two-part divided light receiving element is used for the light receiving section. In this example, the device is so arranged that the necessary light detection angle is obtained by causing the position of the two-part divided light receiving element to move by a driver means and necessary writing pressure is obtained by the writing pressure detection means. The position pointing device in this example requires an electronic circuit device and a battery, for example, for supplying power to the LED and for detecting the wiring pressure.

As a still further example, Japanese Patent Application Kokai Publication No. Hei 11-3170 discloses a system wherein the position pointing device itself is provided with three color light emitting means such as three color LEDs and a writing pressure detection means, or a reflection type method wherein the position pointing device itself is provided with a colored retroreflective member and the reflected light therefrom is used and one-dimensional light receiving element is arranged as a light receiving section. In this example, any of the three color LEDs is turned on to emit light in accordance with the magnitude of the writing pressure whereby the position coordinate is obtained based on the emitted light itself and the writing pressure information is obtained based on the color tone or hue of the light. In the case where the colored retroreflective member is arranged step by step in color tone at the tip portion of the position pointing device, the position coordinate and the writing pressure are obtained based on the changes in light and color in accordance with the up and down movements by the writing pressure.

In the example disclosed in the above Japanese Patent Application Kokai Publication No. Hei 11-3170, there is a problem in that the information concerning the position coordinate and the writing pressure becomes unstable in accordance with the changes in height or inclination of the position pointing device with respect to the contact plain.

Generally, in the optical digitizer, the height of light emitting point of the light discharging means is not at the same level as the surface of the coordinate detection region. Since the light emitting point is required to be at a certain height, it follows that the position pointing device is detected before such device reaches the surface of the coordinate detection region. This undesirable detection causes the occurrence of an erroneous input or erroneous operation, or in the case of an input operation of letters, causes the occurrence of phenomena in which lines or dots become blurred because of no breaks of lines or dots. In order to cope with this problem, there are some examples in which a pen-down of the pointing device is detected through such methods as writing pressure detection means.

However, to use methods by which the pen-down is detected by a sensor, or a switch is caused to be ON, it is necessary for a position pointing device to have a built-in detection sensor or switch means, and to have electronic circuits and batteries for transmitting the pen-down detection signals (with such as infrared rays and weak electric waves). Also, on the side at which the signals are received and processed, it is necessary to arrange electronic circuits for the reception of the signals. A position pointing device requires complicated construction and an increased number of component parts, thus resulting in a costly pointing device.

Also, it is necessary to change sometimes the battery because of the life thereof. Further, there is a problem that, depending on the changes in the height and inclination of the position pointing device, the position of coordinate and the writing pressure information become unstable.

The present invention came about in order to overcome the above described problems in the prior art, and provides a position detection device in which the detection of the pen-down and pen-up of the position pointing device with respect to the surface of the position detection region can be performed stably, and provides a durable position detection device at a low cost. Throughout the specification, the word "pen-up" is used to mean a state wherein the tip of the position pointing device is not in contact with the surface of the coordinate position detection area, whereas the word "pen-down" is used to mean a state wherein the tip is in contact with the surface.

SUMMARY OF THE INVENTION

In order to attain the above purposes, the present invention provides a position detection device which is configured by: a position pointing means having a light reflecting means; a light emitting means for emitting light to the light reflecting means of the position pointing means; a light receiving means for receiving light from the light reflecting means of the position pointing means; and a coordinate calculation means for calculating the position coordinate of the position pointing means based on information from the light receiving means, the position detection device being characterized in that:

the position pointing means has a pen-like shape, and has a movable pen-core portion changeable in its position according to the pressing pressure against the surface of a board, and a light modulation means for changing the characteristics of the reflection light, and a transmission means for transmitting to the light modulation means the displacement of the movable pen-core portion; and     the light receiving means has an up/down state detection means for obtaining up- and down-state information of the position pointing means by detecting-the characteristics of light which have been changed by the light modulation means.

The necessary modulation of light mentioned above can be effected by shielding or blocking a part of the light, and it can also be achieved by the adjustment of the effective reflection area, or of the reflection intensity.

Further, the light modulation may be continuously performed in accordance with the magnitude of the pressing pressure against the board surface.

According to another aspect of the invention, there is provided a position pointing means used in an optical position detection device, the position pointing means having a pen-like shape, and comprising:

a movable pen-core portion subject to displacement by pressure on a board;

a light modulation means for changing characteristics of reflection light; and     a transmission means for transmitting the displacement of the movable pen-core portion to the light modulation means.

According to a further aspect of the invention, there is provided a position detection method using a position detection device which comprises: a position pointing means having a movable pen-core portion and a light reflection means having a retroreflective member; a light emitting means for emitting the light to the light reflection means; a light receiving means for receiving the light from the light reflection means of the position pointing means; and a coordinate calculation means for calculating a position coordinate of the position pointing means based on information from the light receiving means, the method comprising the steps of:

emitting light from the light emitting means to the light reflection means of the position pointing means;

modulating light for changing characteristics of reflection light of the light reflection means based on displacement of the movable pen-core portion produced from the pressure of the position pointing means by an operator onto a coordinate detection surface of the position detection device; and     detecting a pen-down state for obtaining the pen-up and pen-down information of the position pointing means by detecting with the light receiving means characteristics of the light changed by the light modulation means.

BRIEF DESCRIPTION OF THE DRAWINGS

The above and other objects, features and advantages of the present invention will be apparent from the following description of preferred embodiments of the invention explained with reference to the accompanying drawings, in which:

FIGS. 2A and 2B are diagrams showing component examples of the optical unit of the indirect emitting type digitizer according to the invention, FIG. 2A being a top plan view and FIG. 2B being a side view;

PREFERRED EMBODIMENTS OF THE INVENTION

Now, some preferred embodiments of the invention are explained with reference to the accompanying drawings.

Figure 1:
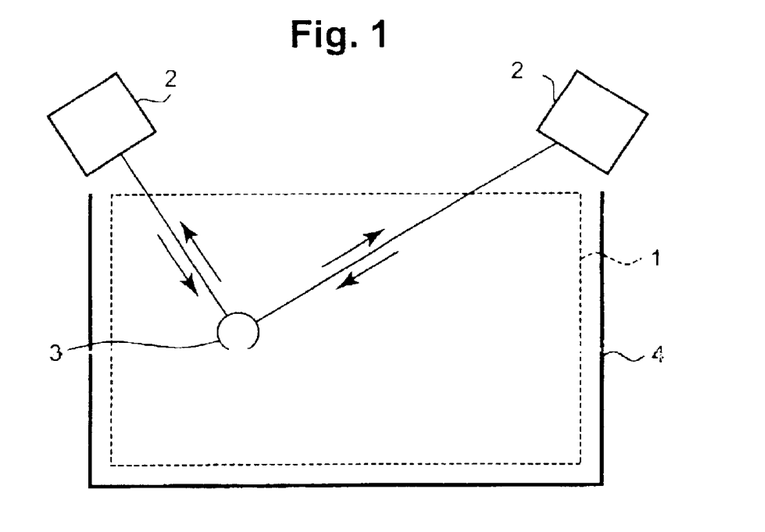
FIG. 1 is a diagrammatic plan view of the optical type digitizer according to the invention.

FIG. 1 generally and diagrammatically shows an optical digitizer according to the present invention. The digitizer has a pair of optical units 2, 2 at a location above a position detection area 1 shown by dotted line in the drawings. By the pair of optical units 2, 2, the coordinate of the position pointing device 3 introduced by an operator on the position detection area 1 is detected. There is provided a reflection frame 4 around the position detection area 1. More specifically, at the portion near the three edges but except one edge where the optical units 2, 2 are provided, of the position detection area 1, there is provided the reflection frame 4. Also, according to the present invention, a part or whole of the reflection light of the position pointing device undergoes changes by a light shielding or blocking mechanism, which allows the input of the coordinate positions, and even the input of letters.

Figure 2A:
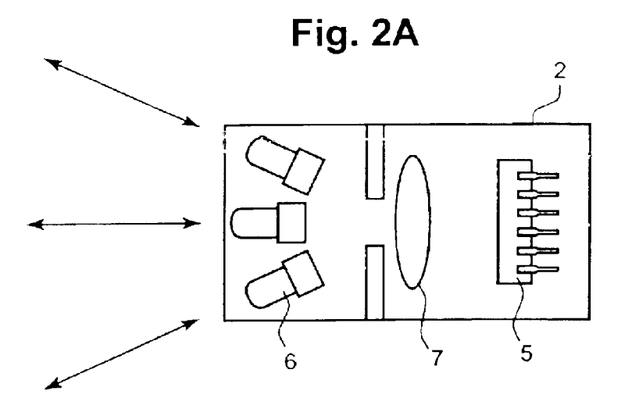
Figure 2B:
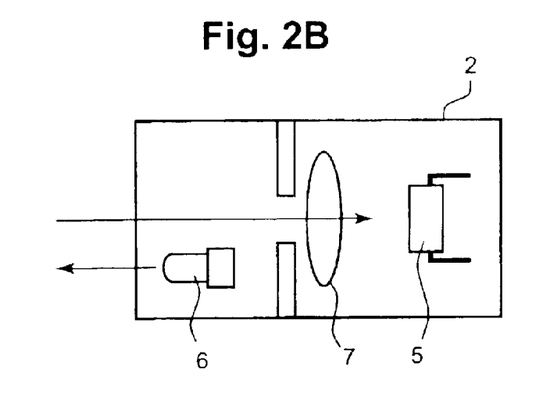

FIGS. 2A and 2B generally and diagrammatically show an optical unit 2 according to the present invention, FIG. 2A being a top view and FIG. 2B being a side view. The optical unit 2 is configured for a digitizer of an indirect light emitting type system which uses a position pointing device having a retroreflective member at the tip portion thereof. The optical unit 2 comprises, in front of a light receiving element 5, a converging lens 7 and a plurality of light sources 6 arranged in a folding fan shape. The converging lens 7 herein is an ordinary optical lens. Also, the optical unit is not limited to an illustrated one since it is appropriate if it emits light and then receives the returned light, and it may well be an ordinary optical unit known as utilizing a half-mirror.

Figure 3A:
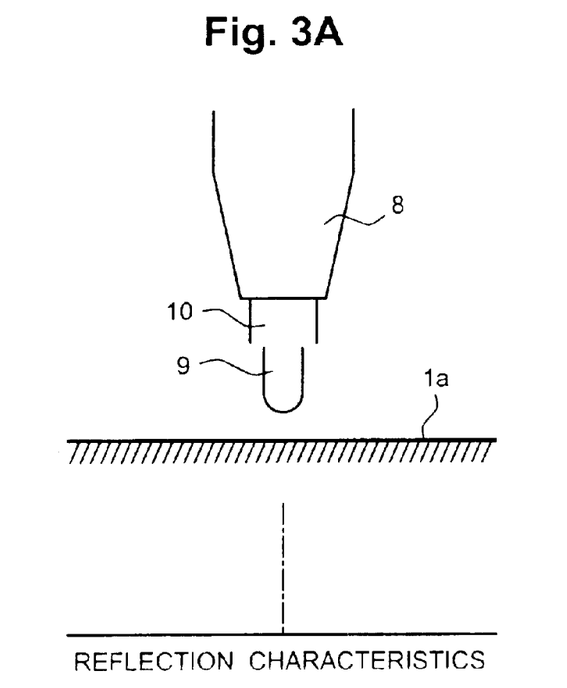
FIGS. 3A and 3B are diagrams showing basic operations of the position pointing device according to the invention, FIG. 3A showing the pen-up state and the reflection characteristics thereat, and FIG. 3B showing the pen-down state and the reflection characteristics thereat.
Figure 3B:
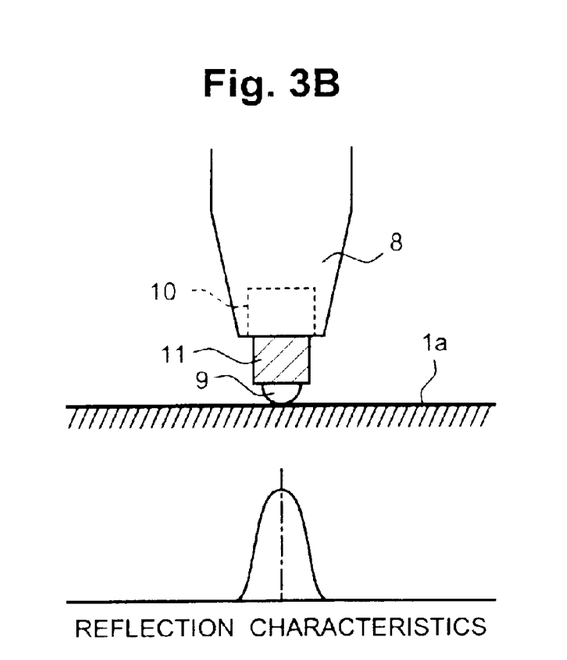

FIGS. 3A and 3B are diagrams showing a basic operational principle of the pen type position detection device according to the invention. The pen-type position pointing device 8 comprises a shielding portion 10, a retroreflective portion 11, and a movable pen-core portion 9. FIG. 3A shows the state of the pen-tip portion and the reflection characteristics of the retroreflective portion 11 at the time when the pen-type position pointing device 8 is in a pen-up state, while FIG. 3B shows the same at the time when the same position pointing device 8 is in a pen-down stat. As shown in FIG. 3A, at the pen-up state, since the shielding portion 10 completely shields the retroreflective portion therein, it is not possible to detect the reflection characteristics of the retroreflection portion. Next, at the pen-down state, a movable pen-core portion 9 is pressed against the surface 1a of the coordinate detection area 1 (see FIG. 1) and the shielding portion 10 is pressed up and, with the retroreflective portion 11 being exposed, the reflection characteristics of the retroreflective portion can be detected. With this configuration, under the pen-up state, even when the pen-tip portion is brought close to the surface 1a of the coordinate detection area 1 and the inclination of the position pointing device 8 is changed, the reflection characteristics of the retroreflective portion 11 are not influenced. Thus, the reflection characteristics of the retroreflective portion 11 at the pen-up state and the pen-down state can stably be detected.

Figure 4A:
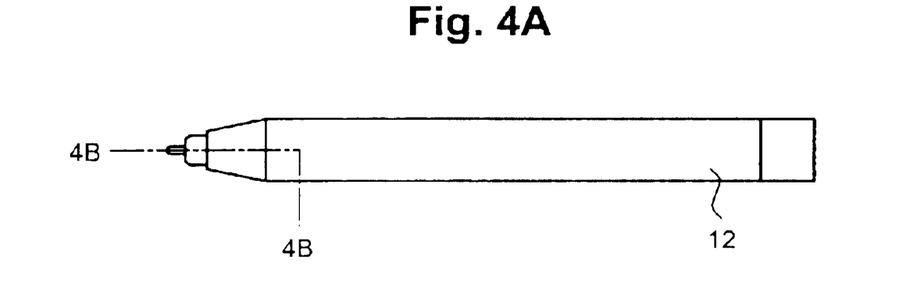
FIGS. 4A, 4B and 4C show a first embodiment of the position pointing device according to the invention, FIG. 4A being the outside view, FIG. 4B being a sectional view at the pen-up state taken along line 4B—4B in FIG. 4A, and FIG. 4C being a sectional view at the pen-down state taken along the same line.
Figure 4B:
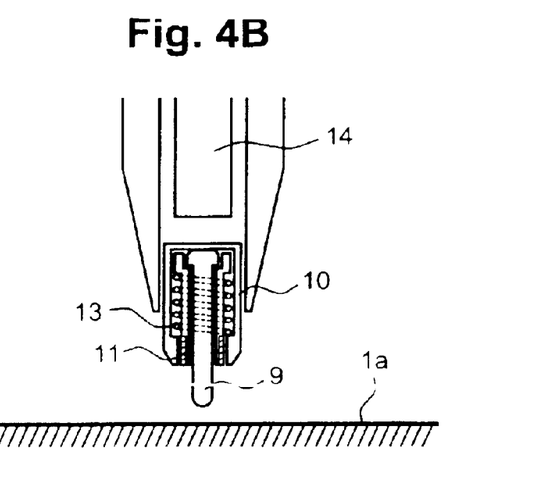
Figure 4C:
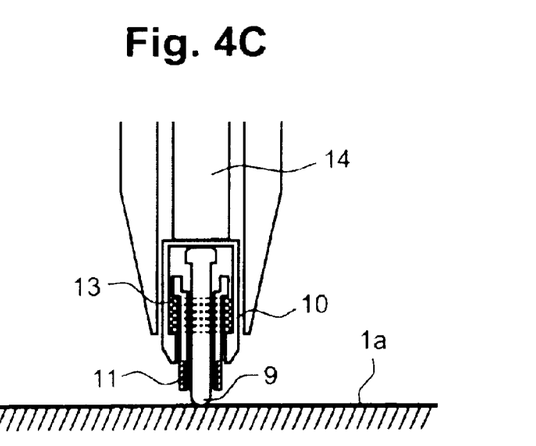

FIGS. 4A, 4B and 4C show a first embodiment of the position pointing device 12 used in the position detection device according to the invention, FIG. 4A being an outside view thereof, FIG. 4B being a sectional view at the pen-up state, taken at line 4B—4B of the position pointing device of FIG. 4A, and FIG. 4C being a sectional view at the pen-down state, taken at the same line of the position pointing device of FIG. 4A. As shown, at the tip portion of the pen-type position pointing device 12, there is provided a movable pen-core portion 9 which is surrounded by the retroreflective portion 11 and the shielding portion 10 in a double-surrounded form. It is configured that, in the normal state, the shielding portion 10 shields the retroreflective portion 11 by the expansion force of a spring member 13. When the movable pen-core portion 9 is pushed-up after its contact on the surface of the coordinate detection area, the shielding portion 10 is pushed-up, the spring member 13 contracts and the shielding portion 10 abuts the stopper 14 so that the retroreflective portion 11 is steadily exposed. With this configuration, when the pen tip of the position pointing device 12 within the position detection area 1 is pressed against the surface 1a of the coordinate detection area 1, the retororeflective portion 11 is exposed and the stable retroreflective light is detected by the-optical unit 2 whereby the coordinate position of the position pointing device 12 is detected. In this example, in the pen-down operation which, by the movable pen-core portion 9, continues until the shielding portion 10 touches the stopper 14, and the exposed area of the retroreflective portion 11 is changed by the amount of movement in which the movable pen-core portion 9 is pressed-in, whereby the reflection characteristics at the reflection portion are changed.

Figure 5A:
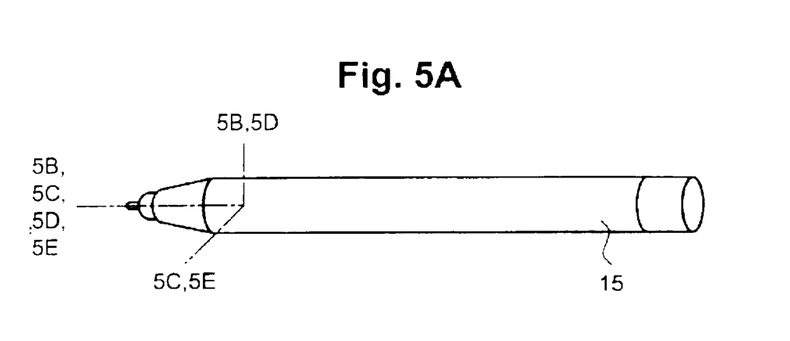
FIGS. 5A–5E show a second embodiment of the position pointing device according to the invention, FIG. 5A being the outside view, FIG. 5B being a sectional view at the pen-up state taken along line 5B—5B in FIG. 5A, FIG. 5C being a sectional view at the pen-up state taken along line 5C—5C, FIG. 5D being a section view-at the pen-down state taken along line 5D—5D, and FIG. 5E being a sectional view at the pen-down state taken along line 5E—5E.
Figure 5B:
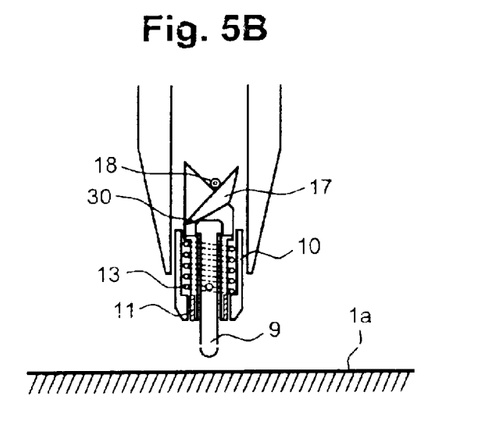
Figure 5C:
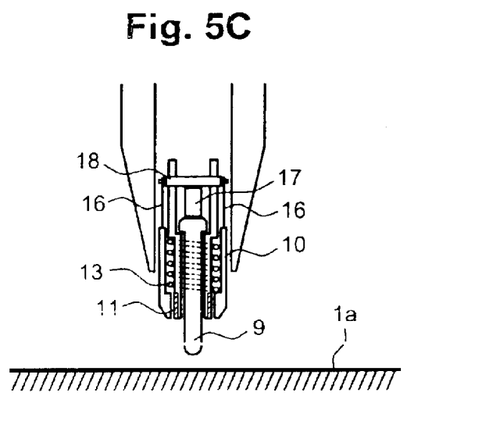
Figure 5D:
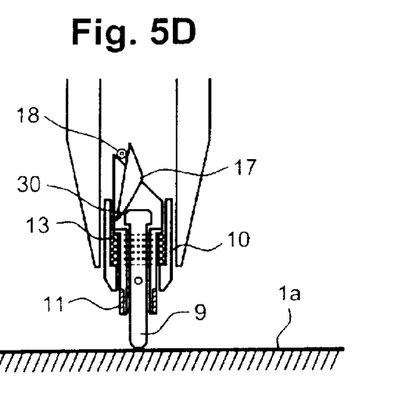
Figure 5E:
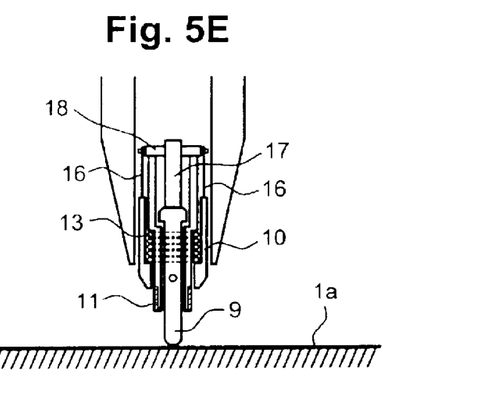

FIGS. 5A–5E show a second embodiment of the position pointing device 15 according to the present invention. FIG. 5A is an outside view thereof, FIG. 5B is a sectional view at the pen-up state, taken at line 5B—5B of the device shown in FIG. 5A, FIG. 5C is a sectional view at the pen-up state, taken at line 5C—5C in FIG. 5A, FIG. 5D is a sectional view at the pen-down state, taken at line 5D—5D in FIG. 5A, and FIG. 5E is a sectional view at the pen-down state, taken at line 5E—5E in FIG. 5A. As shown in the drawings, at the tip portion of the pen-type position pointing device 15, there is provided a movable pen-core portion 9 which is surrounded by the retroreflective portion 11 and the shielding portion 10 in the double surrounded form. It is so arranged that the shielding portion 10 is allowed to shield the retroreflective portion 11 by the expansion force of the spring member 13. When the movable pen-core portion 9 is pushed-in, the movable member 17 moves upwardly with a fulcrum point 30 as the center and pushes up a roller member 18, so that connecting members 16 connected to both the ends of the roller member 18 and the shielding portion 10 connected to the connecting members 16 are pushed up and the retroreflective member 11 is exposed due to the contraction of the spring member 13. With this configuration, when the pen tip of the position pointing device 15 introduced within the position detection area 1 is pushed against the coordinate detection area surface 1a, the retroreflective portion 11 is exposed and the retroreflective light is detected by the optical unit 2 and the coordinate position of the position pointing device is detected. In this example, the utilization of the lever principle and the roller action enabled reducing the amount of pushing-in movement of the movable pen-core portion 9 and enabled increasing the exposure area of the retroreflective portion 11. Thus, even with a small amount of the pushing movement of the pen tip, it is possible to obtain large and effective light reflection characteristics.

Figure 6A:
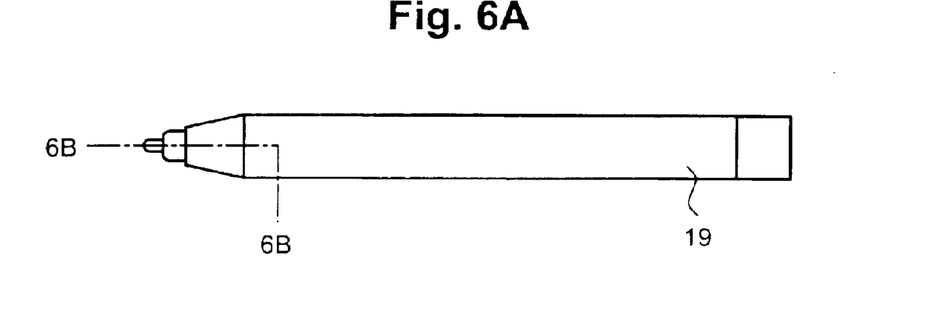
FIGS. 6A, 6B and 6C show a third embodiment of the position pointing device according to the invention, FIG. 6A being the outside view, FIG. 6B being a sectional view at the pen-up state taken along line 6B—6B in FIG. 6A, and FIG. 6C being a sectional view at the pen-down state taken along the same line.
Figure 6B:
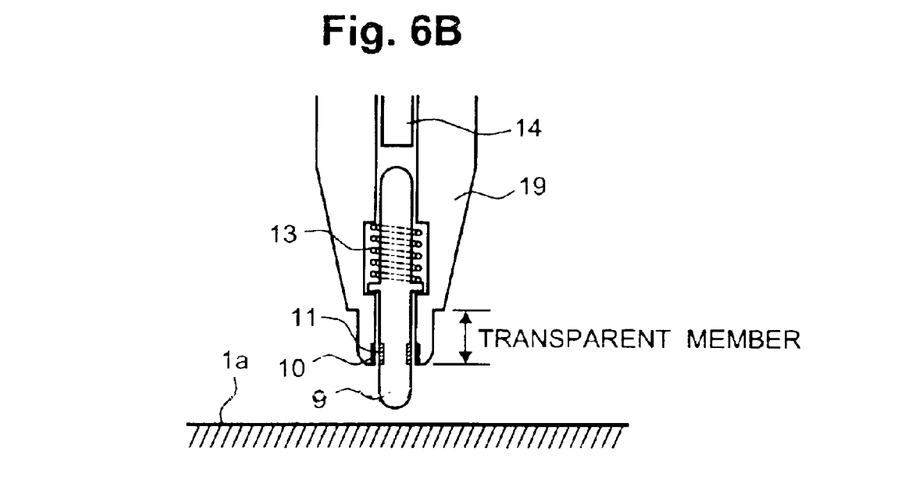
Figure 6C:
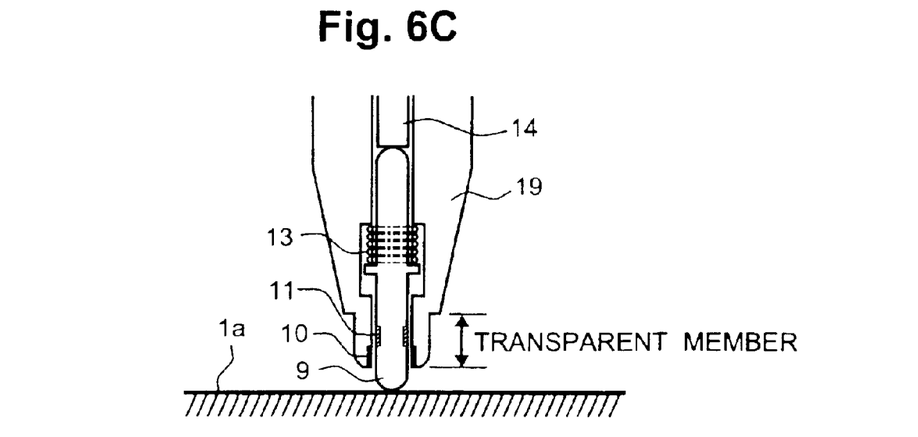

FIGS. 6A, 6B and 6C show a third embodiment of the position pointing device 19 of the present invention. FIG. 6A is an outside view of the device, FIG. 6B is a sectional view at the pen-up state, taken at line 6B—6B of the device shown in FIG. 6A, and FIG. 6C is a sectional view at the pen-down state, taken at the same line in FIG. 6A. As shown in the drawings, at the tip portion of the pen-type position pointing device 19, there is provided a movable pen-core portion 9 and the retroreflective portion 11 is provided on a part of the movable pen-core portion itself, and this is surrounded by the shielding portion 10 at a lower part of the transparent member of the pen tip in such a way that the retroreflective portion 11 is shielded. It is arranged that the shielding portion 10 is allowed to overlap and shield the retroreflective portion 11 by the expansion force of the spring member 13 and, when the movable pen-core portion 9 is pushed-in, the movable pen-core portion 9 sinks and the retroreflective portion 11 deviates from the shielding portion 10 and moves to an up-side of the pen tip portion, and the movable pen-core portion 9 abuts the stopper 14 due to the contraction of the spring member 13 so that the retroreflective portion 11 is seen in a stable state. With this configuration, when the pen tip of the position pointing device 19 introduced within the position detection area 1 is pressed against the coordinate detection area surface 1a, the retroreflective portion 11 is clearly seen and the retroreflective light can be detected by the optical unit 2, and the coordinate position of the position pointing device 19 can be detected. In this example, by the arrangement wherein a thin shielding portion 10 is provided inside the transparent member of the pen tip and further the movable pen-core portion 9 itself is provided with the retroreflective portion 11, it is enabled to reduce the number of component parts thus simplifying the construction concerned.

Figure 7A:
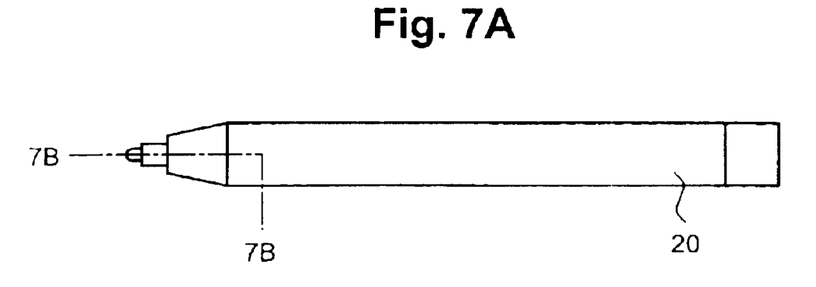
FIGS. 7A, 7b and 7C show a fourth embodiment of the position pointing device according to the invention, FIG. 7A being the outside view, FIG. 7B being a sectional view at the pen-up state taken along line 7B—7B in FIG. 7A, and FIG. 7C being a sectional view at the pen-down state taken along the same line.
Figure 7B:
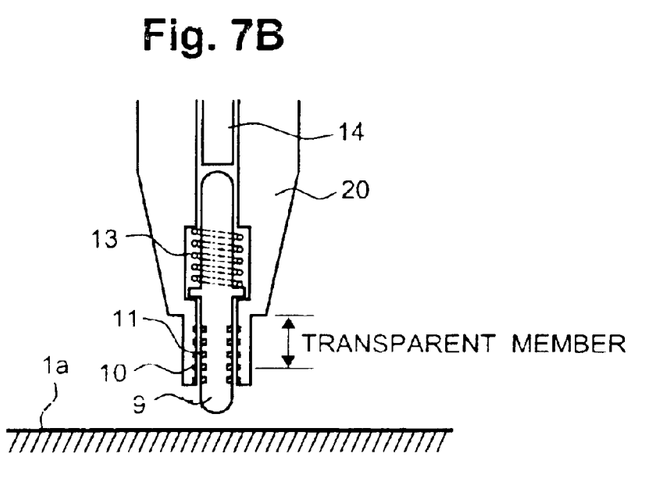
Figure 7C:
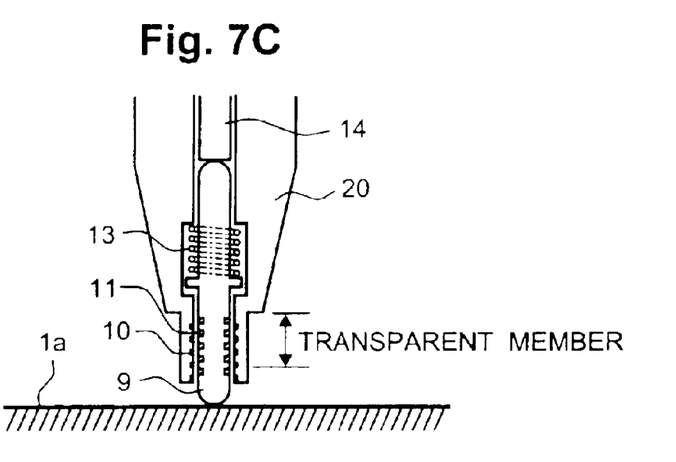

FIGS. 7A, 7B and 7C show a fourth embodiment of the position pointing device 20 according to the present invention. FIG. 7A is an outside view thereof, FIG. 7B is a sectional view at the pen-up state, taken at line 7B—7B of the position pointing device shown in FIG. 7A, and FIG. 7C is a sectional view at the pen-down state, taken at the same line in FIG. 7A. As shown, at the pen tip of the pen type position pointing device 20, there is provided the movable pen-core portion 9 on which a plurality of retroreflective portions 11 each having a predetermined width are provided with the same intervals. The corresponding number of thin shielding portions 10 each having the same predetermined width are provided inside the pen tip of the transparent member with the same intervals, so that the retroreflective portions 11 are overlapped and hidden by the corresponding thin shielding portions 10, respectively, with the expansion force of the spring member 13. There remain transparent portions between the respective thin shielding portions 10. When the movable pen-core portion 9 is pushed, the movable pen-core portion 9 is pushed up so that the respective retroreflective portions 11 are deviated from the corresponding shielding portions 10 and move to the transparent member side and, by the contraction of the spring member 13, the end of the movable pen-core portion 9 abuts the stopper 14, thus enabling the respective retroreflective portions 11 to be seen clearly through the transparent member. With this configuration, when the pen tip of the position pointing device 20 introduced within the position detection area 1 is pressed against the coordinate detection area surface 1a, the retroreflective portion 11 is seen in a stable state, the retroreflective light is detected by the optical unit 2, and the coordinate position of the position pointing device 20 is detected. In this example, as in the third embodiment, the component parts are reduced in number thus making it possible to make the construction simpler and, by making the amount of the pushing-in of the movable pen-core portion 9, it is made possible to detect the reflection characteristics of the light reflection section of the retroreflective portion 11 in a wider range.

Figure 8A:
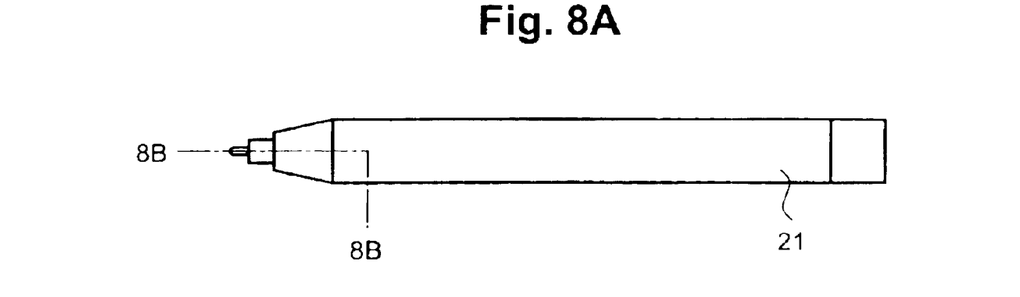
FIGS. 8A, 8B and 8C show a fifth embodiment of the position pointing device according to the invention, FIG. 8A being the outside view, FIG. 8B being a sectional view at the pen-up state taken along line 8B—8B in FIG. 8A, and FIG. 8C being a sectional view at the pen-down state taken along the same line.
Figure 8B:
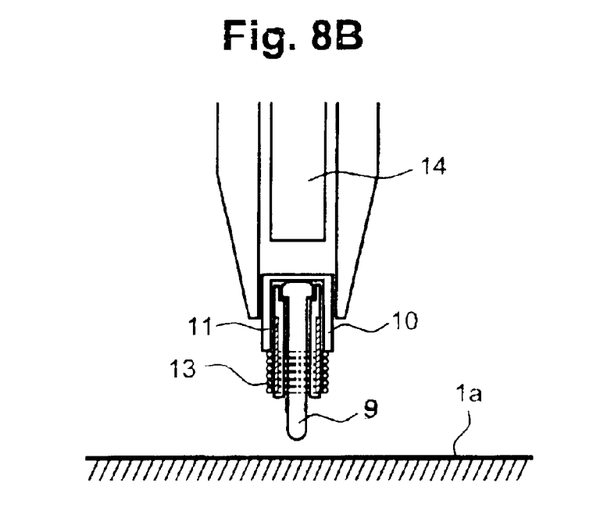
Figure 8C:
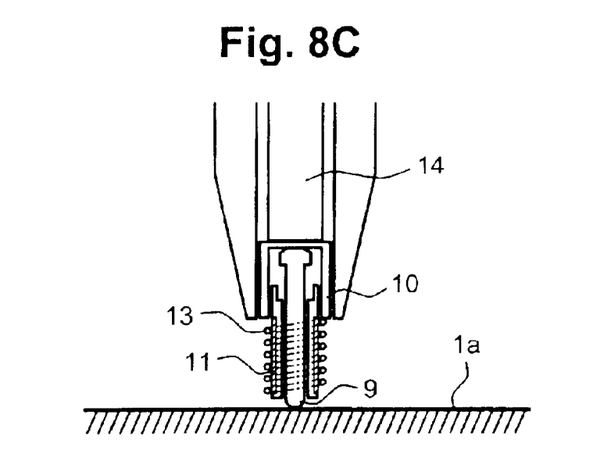

FIGS. 8A, 8B and 8C show a fifth embodiment of the position pointing device 21 according to the present invention. FIG. 8A is an outside view thereof, FIG. 8B is a sectional view at the pen-up state, taken at line 8B—8B of the position pointing device shown in FIG. 8A, and FIG. 8C is a sectional view at the pen-down state, taken at the same line in FIG. 8A. As shown, the pen tip of the pen type position pointing device 21 is provided with the movable pen-core portion 9 which is surrounded by the double surrounded construction of the retroreflective portion 11 and the spring member 13 connected with the shielding portion 10, and the shielding portion 10 is connected to an upper end of the spring member 13. The retroreflective portion 11 is configured to be shielded by the spring member 13 in the contracted state and the shielding portion 10 connected together. When the movable pen-core portion 9 is pressed, the shielding portion 10 is pushed up and the spring member 13 expands. Then, the shielding portion 10 finally abuts the stopper 14 and, from the gaps formed by the expanded spring member 13, the retroreflective portion 11 is exposed in a stable state. With this configuration, when the pen tip of the position detection device 19 introduced within the position detection area 1 is pressed against the coordinate detection area surface 1a, the retroreflective portion 11 is seen in a stable state and the retroreflective light can be detected by the optical unit 2, and the coordinate position of the position pointing device 21 can be detected. In this example, as in the fourth embodiment, it is made possible to detect the reflection characteristics of the light reflection section of the retroreflective portion 11 in a wider range.

Figure 9A:
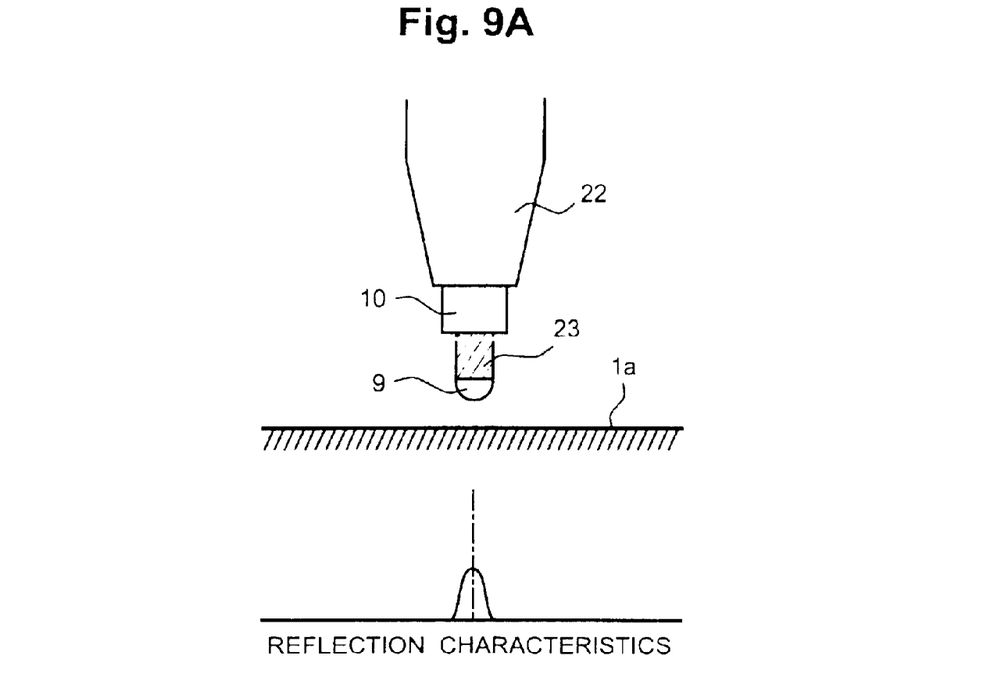
FIGS. 9A and 9B are diagrams showing operations of the modified position pointing device according to the invention, FIG. 9A showing the pen-up state of the device and the reflection characteristics thereat, and FIG. 9B showing the pen-down state of the same device and the reflection characteristics thereat.
Figure 9B:
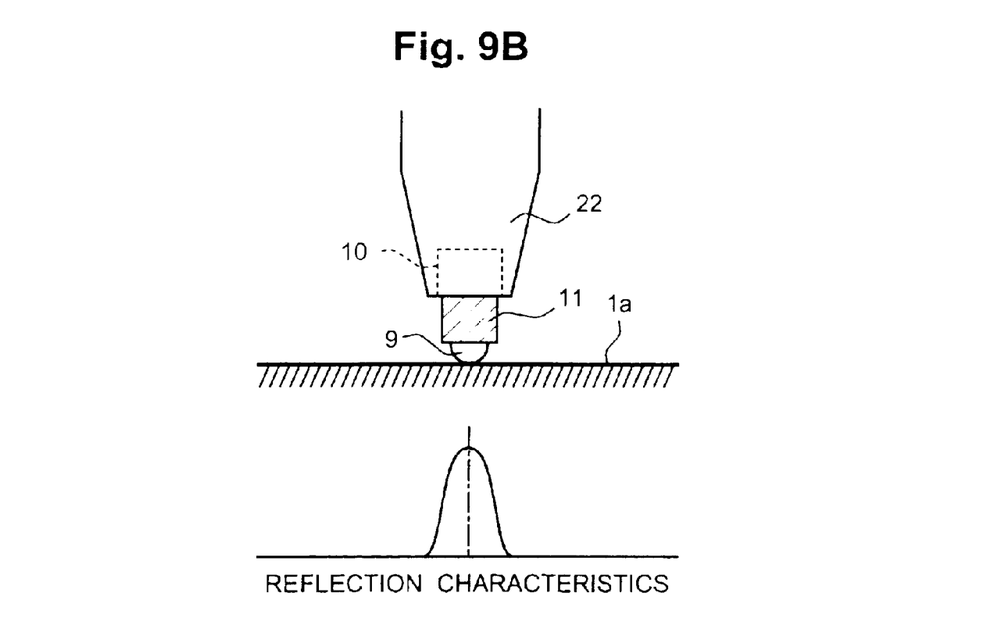

FIGS. 9A and 9B show a modified example of the position detection device 22 according to the present invention. FIG. 9A shows the pen-up state of the pen-tip portion of the device 22 and the reflection characteristics of the retroreflective portion 11 obtained thereat, while FIG. 9B shows the pen-down state of the same device 22 and the reflection characteristics of the retroreflective portion 11 obtained thereat. As shown in FIG. 9A, in the pen-up state, the reflection characteristics of the light reflection section by the retroreflective member 23 provided on the movable pen-core portion 9 with a part thereof being exposed are detected. Next, in the pen-down state in FIG. 9B, when the movable pen-core portion 9 is pressed against the coordinate detection area surface 1a and the retroreflective member 23 of the movable pen-core portion 9 is hidden and the shielding portion 10 is pushed up. By the exposure of the retroreflective portion 11 thus achieved, the reflection characteristics of the light reflection portion of the retroreflective portion 11 are detected. In this configuration, in the pen-up state shown in FIG. 9A, when the pen tip is brought close to the coordinate detection surface 1a, the reflection characteristics of the light reflection portion by-the retroreflective portion 23 provided on the movable pen-core portion 9 are detected. In the pen-down state shown in FIG. 9B, the reflection characteristics of the light reflection portion by the retroreflective portion 11 are detected. In this way, two kinds of the reflection characteristics can be effectively detected in the pen-up state and the pen-down state.

Figure 10A:
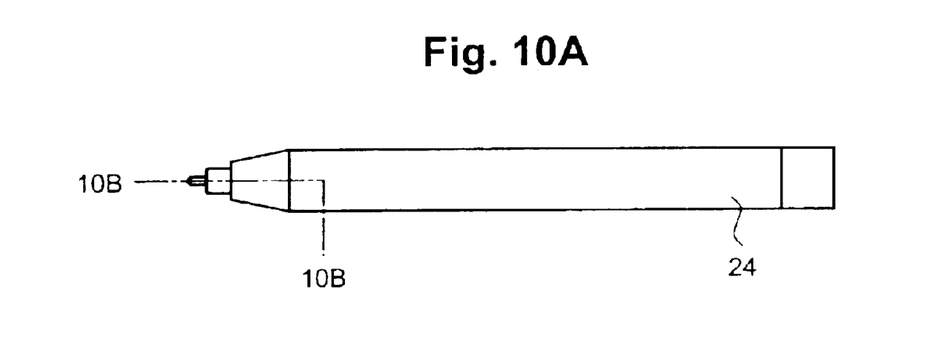
FIGS. 10A, 10B and 10C show a sixth embodiment of the position pointing device according to the invention, FIG. 10A being the outside view, FIG. 10B being a sectional view at the pen-up state taken along line 10B—10B in FIG. 10A, and FIG. 10C being a sectional view at the pen-down state taken along the same line.
Figure 10B:
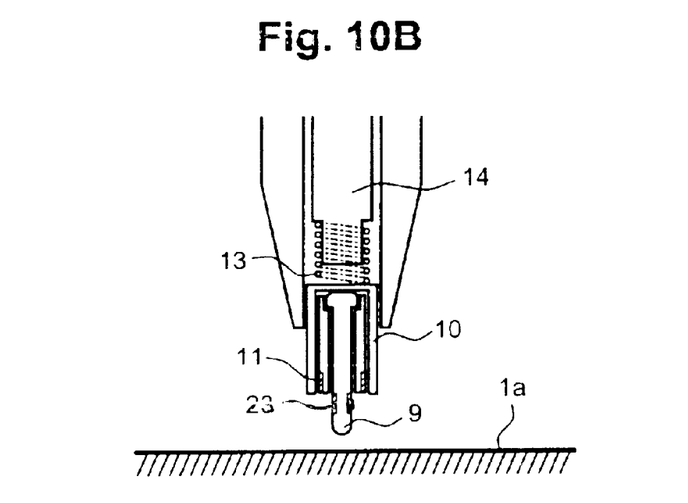
Figure 10C:
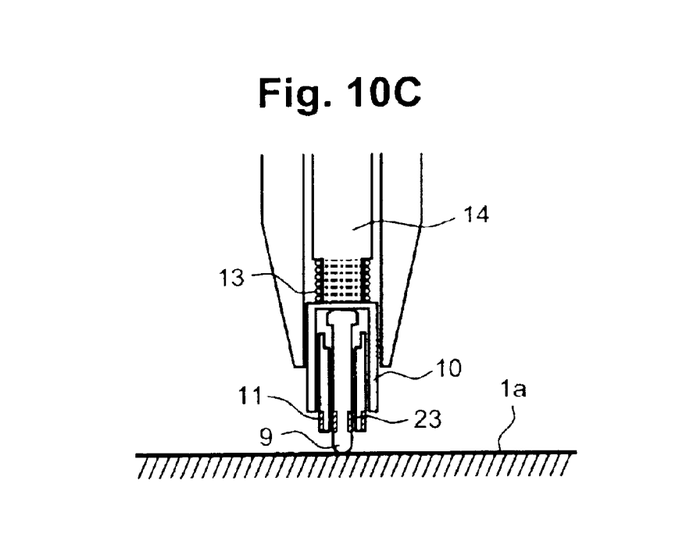

FIGS. 10A, 10B and 10C show a sixth embodiment of the position pointing device 24 according to the present invention. FIG. 10A is an outside view thereof, FIG. 10B is a sectional view at the pen-up state of the device 24, taken at line 10B—10B in FIG. 1A, and FIG. 10C is a sectional view at the pen-down state of the same device, taken at the same line.

As shown in the drawings, the pen tip of the pen type position pointing device 24 is provided with the movable pen-core portion 9 and, on a part of the movable pen-core portion 9, there is provided the retroreflective member 23 with the retroreflective member being exposed. Surrounded thereby, the retroreflective portion 11 and the shielding portion 10 constitute two fold construction. It is configured that, by the expansion force of the spring member 13, the shielding portion 10 hides the retroreflective portion 11 and, when the movable type pen-core portion 9 is pressed, the shielding portion 10 is pushed up, the retroreflective portion 11 is exposed due to the contracting action of the spring member 13, and the retroreflective member 23 of the movable pen-core portion 9 is hidden.

With the above configuration, when the pen tip of the position pointing device 24 within the position detection area 1 approaches the coordinate detection area surface 1a, the retroreflective light by the retroreflective member 23 provided to the movable pen-core portion 9 with a part thereof being exposed is detected by the optical unit 2, thus enabling the detection of the coordinate position of the position pointing device 24.

Further, when the movable pen-core portion 9 is pressed against the coordinate detection area surface 1a, the shielding portion 10 is pushed up and, with the contraction of the spring member 13, the shielding portion 10 abuts the stopper 14 causing the retroreflective member 23 of the movable pen-core portion 9 to be hidden and the retroreflective portion 11 to be exposed in a stable state. Thus, the retroreflective light of the retroreflective portion 11 is detected by the optical unit 2, and the coordinate position of the position pointing device 24 is detected.

In the above example, due to the differences in the reflection characteristics of the light reflection portion under the pen-up state and the pen-down state, it has been made possible to have them correspond to the "pointing" function and the "click" function as in a mouse.

Figure 11A:
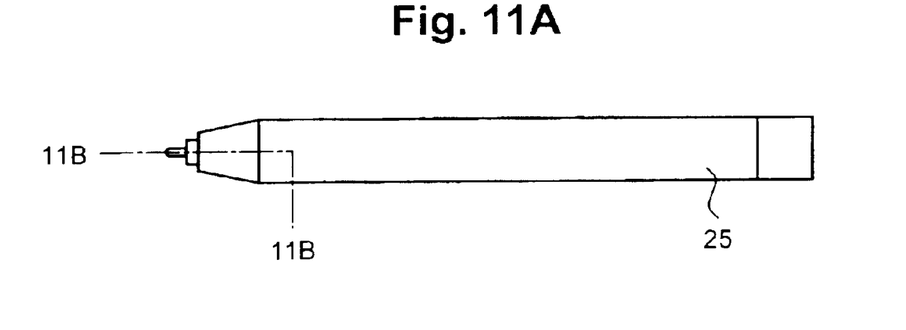
FIGS. 11A, 11B and 11C show a seventh embodiment of the position pointing device according to the invention, FIG. 11A being the outside view, FIG. 11B being a sectional view at the pen-up state taken along line 11B—11B in FIG. 11A, and FIG. 11C being a sectional view at the pen-down state taken along the same line.
Figure 11B:
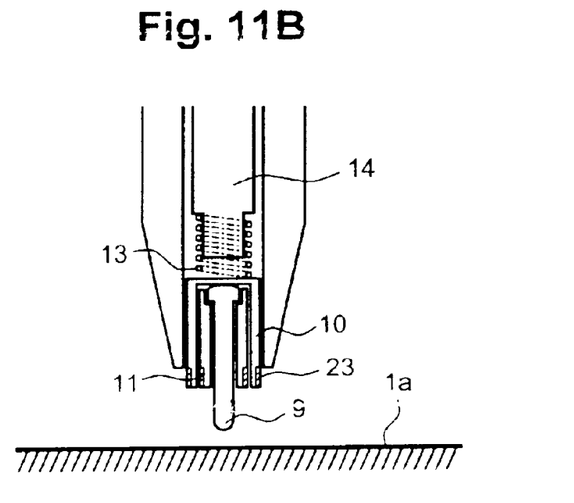
Figure 11C:
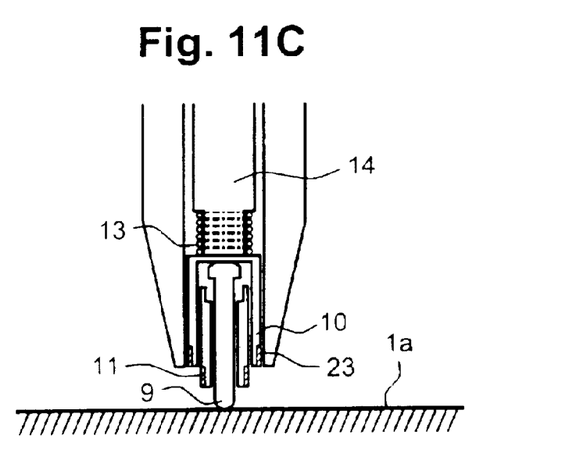

FIGS. 11A, 11B and 11C show a seventh embodiment of the position pointing device 25 according to the present invention. FIG. 11A is an outside view thereof, FIG. 11B is a sectional view at the pen-up state of the device 25, taken at line 11B—11B in FIG. 11A, and FIG. 11C is a sectional view at the pen-up state of the same device, taken at the same line.

As shown in the drawings, the pen tip of the pen type position pointing device 25 is provided with the movable pen-core portion 9 and, in a surrounded manner, two fold structure of the retroreflective portion 11 and the shielding portion 10 are provided and, outside the shielding portion 10, the retroreflective member 23 is provided so that, by the expansion force of the spring member 13, the shielding portion 10 hides the retroreflective portion 11, and the retroreflective member 23 provided outside the shielding portion 10 is configured to be exposed. Thus, when the movable pen-core portion 9 is pressed, the shielding portion 10 is pushed up so that the retroreflective member 23 provided outside the shielding portion 10 is hidden in the main body of the pen and, by the contraction of the spring member 13, the retroreflective portion 11 is exposed.

With the above configuration, when the pen tip of the position pointing device 25 within the position detection area 1 approaches the coordinate detection area surface 1a, the retroreflective light by the retroreflective member 23 provided outside the shielding portion 10 is detected by the optical unit 2, thus enabling the detection of the coordinate position of the position pointing device 25.

Further, when the movable pen-core portion 9 is pressed against the coordinate detection area surface 1a, the shielding portion 10 is pushed up, and the retroreflective member 23 provided outside the shielding portion 10 is hidden in the main body of the pen and, by the contraction of the spring member 13, the shielding portion 10 abuts the stopper 14 so that the retroreflective light of the retroreflective portion 11 is exposed in a stable state and the retroreflective light of the retroreflective portion 11 is detected by the optical unit 2 and the coordinate position of the position pointing device 25 is detected.

The above seventh embodiment can attain the same functions as in the sixth embodiment.

If it is so arranged that, in-stead of the movable pen-core portion as in the above respective embodiments, a mechanism in which a core of any writing tools such as a ballpoint pen is used, such mechanism may be used as the position pointing device of the invention while allowing actual writing on a paper.

Also, the position pointing device according to the present invention in which the shielding portion is made movable is not limited to the illustrated examples as such arrangement can be variously modified without departing from the essence of the invention.

As explained above, according to the position pointing device equipped with the shielding mechanism, which device is used for the coordinate position detection device, the difference in the reflection characteristics of the light reflection in the pen-up state and the pen-down state of the position pointing device is accurately detected. Also, since the pen-down detection has been realized by the use of a simple mechanical arrangement, the electronic circuitry and batteries are made unnecessary, which made it possible to reduce the component parts in number and to reduce the manufacturing time and processes. With the reduction in the manufacturing costs, it is made possible to provide the position pointing devices at low cost.

Also, according to the present-invention, since the position pointing device is constructed only by mechanical components, the device is not influenced by any electric causes such as electromagnetic waves and noises. Thus, the device may be positively utilized in the field of plasma display.

What is claimed is:

1. A position detection device comprising a position pointing means having a light reflection means: a light emitting means for emitting light to said light reflection means of said position pointing means; a light receiving means for receiving light from said light reflection means of said position pointing means; and a coordinate calculation means for calculating the position coordinate of said position pointing means based on information from said light receiving means, said position detection device being characterized in that:

said position pointing means has a pen-like shape, and has a movable pen-core portion changeable in its position according to the pressing pressure against the surface of a board, and a light modulation means for changing the characteristics of the reflection light, and a transmission means for transmitting to said light modulation means the displacement of said movable pen-core portion;

said light receiving means has an up/down state detection means for obtaining up- and down-state information of said position pointing means by detecting the characteristics of light which have been changed by said light modulation means; and wherein said light receiving means comprises at least two detection means with a predetermined space being provided therebetween, for obtaining information on incident angles of the light coming from said light reflection means, and said coordinate calculation means is adapted to calculate the position of said position pointing means based on a triangular principle from at least two incident angle information.

2. A position detection device according to claim 1, in which said light reflection means comprises a retroreflective means having retroreflective characteristics, and said light emitting means is disposed in the vicinity of said light receiving means so that the light from said light emitting means is retroreflected by said retroreflective means and is then incident on said light receiving means.

3. A position detection device according to claim 1, in which said light modulation means comprises a light shielding mechanism adapted to shield or block a part or all of the reflection light.

4. A position detection device according claim 1, in which said light modulation means comprises a means which changes a light reflection area of said light reflection means.

5. A position detection device according to claim 1, in which said light modulation means comprises a means which changes intensity of the reflection light of said light reflection means.

6. A position detection device according to claim 1, in which said transmission means comprises a means which enlarges the amount of displacement of said movable pen-core portion and transmit it to said light modulation means.

7. A position detection device according to claim 1, in which said transmission means comprises a means which continuously changes the changing amount of the light modulation means according to the amount of displacement of said movable pen-core portion.

8. A position detection method using a position detection device which comprises: a position pointing means having a movable pen-core portion and a light reflection means having a retroreflective member; a light emitting means for emitting the light to said light reflection means; a light receiving means for receiving the light from said light reflection means of the position pointing means; and a coordinate calculation means for calculating a position coordinate of said position pointing means based on information from said light receiving means, said method comprising the steps of:

emitting light from said light emitting means to the light reflection means of said position pointing means;

modulating light for changing characteristics of reflection light of said light reflection means based on displacement of said movable pen-core portion produced from the pressure of said position pointing means by an operator onto a coordinate detection surface of said position detection device;

detecting a pen-down state for obtaining the pen-up and pen-down information of said position pointing means by detecting with said light receiving means characteristics of the light changed by said light modulation means; and wherein said pen-down state detecting step comprises a step of detecting a pen-down state based on the information of incident angles of light coming from said light reflection means of said position pointing means, said information being received by at least two light receiving means with a predetermined space being provided therebetween.

9. A position detection method according to claim 8, in which the light modulation in said light modulating step is performed by shielding or blocking a part or all of the reflection light.

10. A position detection method according to claim 8, in which the light modulation in said light modulating step is performed by changing a light reflection area of said light reflection means.

11. A position detection method according to claim 8, in which the light modulation in said light modulating step is performed by changing the intensity of the reflection light of said light reflection means.

12. A position detection method according to claim 8, in which the light modulation step is performed by enlarging the displacement amount of said movable pen-core portion and then modulating the light.

13. A position detection method according to claim 8, in which the light modulation step is performed by continuously changing the changing amount of said light modulation means according to the amount of displacement of said movable pen-core portion.

14. A pen-down state detection method using a position detection device which comprises: a position pointing means having a movable pen-core portion and a light reflection means having a retroreflective member; a light emitting means for emitting the light to said light reflection means; a light receiving means for receiving the light from said light reflection means; of said position pointing means; and a coordinate calculating means for calculating a position coordinate of said position pointing means based on information from said light receiving means, said method for detecting as to whether a tip of said movable pen-core portion is in contact with a position coordinate detection surface comprising the steps of:

emitting light from said light emitting means to the light reflection means of said position pointing means;

modulating light for changing characteristics of reflection light of said light reflection means based on displacement of said movable pen-core portion produced from the pressure of said position pointing means by an operator onto said position coordinate detection surface of said position detection device;

detecting a pen-down state for obtaining the pen-up and pen-down information of said position pointing means by detecting with said light receiving means characteristics of the light changed by said light modulation means; and wherein said pen-down state detecting step comprises a step of detecting a pen-down state based on the information of incident angles of light coming from said light reflection means of said position pointing means, said information being received by at least two light receiving means with a predetermined space being provided therebetween.

15. A pen-down state detection method according to claim 14, in which the light modulation in said light modulation step is performed by shielding or blocking a part or all of the reflection light.

16. A pen-down state detection method according to claim 14, in which the light modulation in said light modulation step is performed by changing the light reflection area of said light reflection means.

17. A pen-down state detection method according to claim 14, in which the light modulation in said light modulation step is performed by changing the intensity of the reflection light of said light reflection means.

18. A pen-down state detection method according to claim 14, in which the light modulation step is performed by enlarging the displacement amount of said movable pen-core portion and then modulating the light.

19. A pen-down state detection method according to claim 14, in which said light modulation step is performed by continuously changing the amount of modulation of the light modulation according to the amount of displacement of said movable pen-core portion.

* * * * *

UNITED STATES PATENT AND TRADEMARK OFFICE
CERTIFICATE OF CORRECTION

PATENT NO. : 6,714,311 B2
DATED : March 30, 2004
INVENTOR(S) : Akio Hashimoto

It is certified that error appears in the above-identified patent and that said Letters Patent is hereby corrected as shown below:

Column 8,
Line 59, replace "line 10B—10B in FIG. 1A, and FIG. 10C is a sectional view" with
-- line 10B—10B in FIG. 10A, and FIG. 10C is a sectional view --

Column 10,
Line 8, replace "If it is so arranged that, in-stead of the movable pen-core" with -- If it is so arranged that, instead of the movable pen-core --

Column 12,
Line 18, replace "reflection means; of said position pointing means; and a" with
-- reflection means of said position pointing means; and a --

Signed and Sealed this

Twenty-second Day of February, 2005

JON W. DUDAS
*Director of the United States Patent and Trademark Office*